United States Patent [19]

Keifert

[11] 4,291,104
[45] Sep. 22, 1981

[54] BRAZED CORROSION RESISTANT LINED EQUIPMENT

[75] Inventor: Hibbard G. Keifert, Torrance, Calif.

[73] Assignee: Fansteel Inc., N. Chicago, Ill.

[21] Appl. No.: 73,326

[22] Filed: Sep. 7, 1979

Related U.S. Application Data

[63] Continuation of Ser. No. 897,756, Apr. 17, 1978, abandoned, which is a continuation of Ser. No. 708,060, Jul. 25, 1976, abandoned.

[51] Int. Cl.³ ............................................. B01J 19/02
[52] U.S. Cl. .................................. 428/594; 228/184; 422/241; 428/596; 428/673; 428/674; 428/926
[58] Field of Search ............... 428/591, 593, 594, 604, 428/660–667, 926, 596, 597; 138/140–148, DIG. 6, DIG. 8, DIG. 10; 228/183, 184; 432/264; 422/241; 113/116 W

[56] References Cited

U.S. PATENT DOCUMENTS

| | | | |
|---|---|---|---|
| 1,153,724 | 9/1915 | Stocker | 138/140 |
| 1,964,123 | 6/1934 | Kaiser | 138/148 |
| 2,172,819 | 9/1939 | Howard et al. | 228/184 |
| 2,232,656 | 2/1941 | Davis | 428/614 |
| 2,991,806 | 7/1961 | Rocheville et al. | 138/148 |
| 3,148,953 | 9/1964 | Goto | 228/184 |
| 3,235,947 | 2/1966 | Söhlemann | 228/183 |
| 3,394,446 | 7/1968 | Valgi | 428/594 |
| 3,848,314 | 11/1974 | Stohr | 428/614 |
| 3,956,543 | 5/1976 | Stangeland | 428/604 |
| 4,117,201 | 9/1978 | Keifert | 428/591 |

FOREIGN PATENT DOCUMENTS 772859  4/1957 United Kingdom ............... 428/634

*Primary Examiner*—Michael L. Lewis
*Attorney, Agent, or Firm*—Barnes, Kisselle, Raisch & Choate

[57] ABSTRACT

An improved brazed construction and method for fabrication of equipment having a corrosion resistant liner on a base metal backing is disclosed, and involves incorporating symmetrical convolutions in the liner normal to the direction of maximum thermal expansion.

9 Claims, 2 Drawing Figures

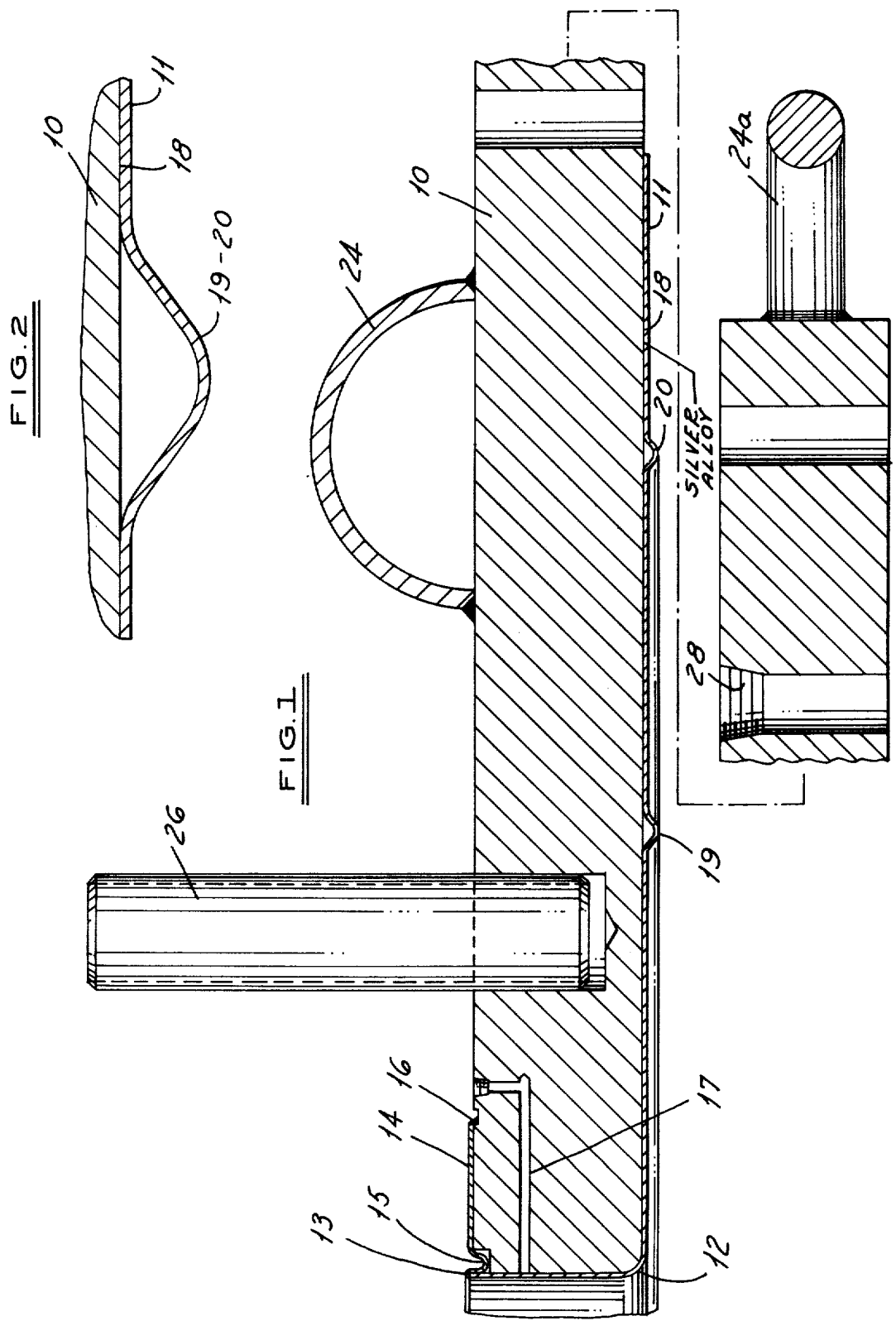

BRAZED CORROSION RESISTANT LINED EQUIPMENT

This is a continuation of application Ser. No. 897,756, filed Apr. 17, 1978 as a continuation of application Ser. No. 708,060 filed July 25, 1976 and now both abandoned.

The invention covers an improved equipment construction assembly and method of construction for use in the fabrication of chemical process equipment that has walls comprised of two or more layers of materials, especially for chemical process applications in which resistance to corrosion is required. The method of construction relates to improvements in bonding a large surface area layer of a special purpose metal or alloy, such as a metal having high corrosion resistance, by brazing, using an improved practice, to a backing of a more common base metal. The invention especially relates to an improved wall construction with a bonded surface lining or facing of a dissimilar material to that of the backing material, particularly to cases where the facing material is not generally metallurgically compatible with the backing material.

The improved construction and method of fabrication of this invention can be applied to a variety of industrial equipment, especially to chemical process equipment where it is desired to have the corrosion resistant facing material bonded to a structural supporting base metal backing.

The improved construction can be used with a large number of dissimilar metal combinations. These combinations include ductile, fabricable and weldable refractory or reactive metals, or their alloys, as linings or facings on backing materials such as mild steels, stainless steels, copper-base alloys, nickel-base alloys and cobalt-base alloys. The improved method is generally applied to assemblies where the special purpose metal is not metallurgically compatible with the supporting base metal, and so direct fusion welds of the facing material and the base metal cannot be made.

Special purpose metal or alloy layers on a more common base metal substrate are well known in the art and have been used for many years. One general area where such dissimilar metal combinations have been employed is in chemical process equipment. Here it is typical practice to use a relatively thin layer of the special purpose metal or alloy to provide resistance to chemical attack, and use a lower cost, more common base metal as the structurally supporting backing. The fabrication of such equipment can present severe problems, especially when the lining material is metallurgically dissimilar from the backing material. For instance, consider a tantalum layer on a mild steel backing. Tantalum has a melting point about 3000° C. (5430° F.), while mild steel melts at about 1530° C. (2790° F.); mild steel has a coefficient of thermal expansion about twice that of tantalum; and iron and tantalum react at a sufficiently high temperature to produce the brittle intermetallic compound $TaFe_2$ and eutectics of this compound and the terminal iron-rich and tantalum-rich solid solutions (see "Columbium and Tantalum," by F. T. Sisco and E. Epremian, published by John Wiley and Sons, Inc., 1963).

It is often desired that the layer of special purpose metal or alloy be bonded to the structurally supporting backing material. Such bonding has been done in the state-of-the-art by techniques including explosive cladding (such as the Detaclad process, trademark of E. I. duPont de Nemours and Company), roll bonding, and brazing, such as with silver brazing alloys. The first two of these techniques, explosive cladding and roll bonding, result in a direct metallurgical bond of the cladding layer to the substrate or base metal. However, these methods are somewhat limited in regard to the size of object that can be clad, and they also can be used to bond only generally flat and uniform geometrical shapes. They are also relatively high cost methods for applying a clad layer, and present additional problems in forming of the clad member during subsequent fabrication to produce the final equipment configuration.

Brazing of refractory and reactive metals, and their alloys, to themselves and to dissimilar metal backings, such as mild steel or stainless steel, was previously known. M. L. Torti and R. W. Douglass describe experiments to investigate brazing alloys and practices for brazing tantalum and their alloys to themselves and to stainless steel (see "Brazing of Tantalum and Its Alloys," Refractory Metals and Alloys III: Applied Aspects, Part One, Volume 30, AIME Metallurgical Society Conference, Dec. 9-10, 1963). Brazing with silver brazing alloys was found to provide generally the best results. The preferred silver brazing alloys and practice for furnace brazing in vacuum are covered in the same reference.

When attempts are made to braze a special metal such as tantalum to a mild steel substrate, especially when large areas of the article are to be clad, serious difficulties have been experienced in obtaining good bonding and distortion-free assemblies. This occurs when an initially flat sheet of tantalum is placed over a large steel surface with the brazing alloy in foil or powder form placed between these materials. Because mild steel has a coefficient of thermal expansion about twice that of tantalum, during cooling from the furnace brazing the brazed bonded layer of tantalum tends to become severely distorted, wrinkled and buckled. Such distortion can also fracture the bond in some areas.

This invention provides an improved brazed construction for large bonded walls that permits achievement of flat and smooth bonds in furnace brazed assemblies of dissimilar materials, such as a tantalum alloy layer brazed to a mild steel substrate using a silver brazing alloy as filler material in the bond.

A principal object of this invention is to provide an improved wall assembly comprised of a thin layer of a special purpose metal or alloy, such as a refractory metal or reactive metal, or their alloys, brazed to an iron-base or non-ferrous base metal.

A further object is to provide a method of furnace brazing a thin layer of a special purpose metal or alloy layer to a more common base metal backing to obtain a smooth and continuous brazed assembly relatively free from distortion.

These and other objects provided by this improved wall assembly and method of fabrication will be apparent to those skilled in the art by the following description of drawings and the preferred embodiment of the invention.

PRELIMINARY DISCUSSION OF THE DRAWING

FIG. 1 shows a cross-section of a steel flange having a tantalum alloy layer silver brazed to the steel substrate over a substantial portion of the surface.

FIG. 2 shows a longitudinal section through a convolution formed in the tantalum alloy layer.

GENERAL DESCRIPTION OF THE INVENTION

An example of the improved brazed assembly construction and method of fabrication of this invention is given as a specific embodiment in which a tantalum material is employed as a corrosion resistant facing material on a mild steel backing material. Tantalum-lined or clad materials have been used in a wide variety of chemical applications where tantalum provides corrosion resistance to the severe corrosive conditions. Because of the high cost of tantalum, such composite wall constructions as used in chemical process equipment typically employ a thin tantalum lining to resist the corrosion conditions, and a lower cost base metal, commonly mild or plain carbon steel, as the structural member or backing material in the wall. Some examples of such tantalum lined chemical process equipment include thermowells, bayonet heaters, various condensers and heat exchangers, vessels, piping, valves and fittings. In the specific example, a tantalum-clad steel flange is described.

In the specific embodiment described in the example, the lining is usually either commercially pure, unalloyed tantalum, or it may be a tantalum alloy such as Fansteel "63" Metal manufactured by Fansteel Inc. The Fansteel "63" Metal contains 2.5 weight percent tungsten, 0.15 weight percent columbium, balance essentially tantalum as discussed in commonly assigned U.S. Pat. No. 3,592,639.

This tantalum alloy material has an ultimate tensile strength about fifty percent higher and yield strength about twice that of unalloyed tantalum at a temperature about 200° C. (390° F.), which temperature is experienced in a growing number of chemical process applications. The corrosion resistance of this alloy has been shown to be at least equal to pure tantalum in many environments.

Although the lining material is described as unalloyed tantalum or Fansteel "63" Metal in the preferred embodiment, it should be readily apparent that the wall construction and methods of fabricating it, as described in this invention, can be equally well applied when the facing material is essentially any ductile, fabricable and weldable refractory metal or alloy, including other tantalum-base alloys, columbium, and columbium-base alloys, and vanadium and vanadium-base alloys, or the reactive metals titanium, zirconium, and hafnium, and their alloys.

The specific embodiment of the wall construction that is described employs mild steel as the backing material. Again, backing materials that can be utilized in wall constructions of this invention can be one or more layers of a number of common base metals, such as other fabricable and weldable steels, including stainless steels, copper-base, nickel-base, and cobalt-base materials; or the backing material can be a refractory metal or reactive metal, or their alloys, having a composition different from that of the facing material.

DETAILED DESCRIPTION OF PREFERRED EMBODIMENT

FIG. 1 shows a partial transverse section of a mild steel flange on which a layer of Fansteel "63" Metal has been furnace brazed with a silver brazing alloy.

The steel flange 10 has certain design features unique to the specific application, including a steel cooling ring 24 on the top surface, equally spaced vertical steel studs 26 embedded in the flange, and a number of machined holes around the outer periphery and a handle 24A. These features are specific to the application and do not constitute a portion of the invention, but are shown to indicate the relative position of the tantalum alloy layer on the steel flange 10. The steel flange is 68" outside diameter and 24" inside diameter by 2¼" thickness.

The layer 11 of Fansteel "63" Metal that is clad on the steel flange 10 is formed from 0.030" thickness sheet with a radius 12 to fit snugly to the bottom surface and inside diameter of the steel flange. Thus, as shown in FIG. 1, the hole through the flange 10 is lined by a circumferentially continuous and generally axially extending portion of the tantalum layer 11. This tantalum layer 11 is produced by forming and fusion welding sheets of the tantalum material. The fusion butt welds used to bond the tantalum alloy sheets are made by the inert gas shielded tungsten arc process (commonly called TIG welding) by the procedure described later.

In preparation for brazing the tantalum material to the steel flange 10, the steel is first cleaned by solvent degreasing of the originally machined surface in order to remove all oil, grease and other soils. Then, the steel flange is electroplated with nickel to provide a flash coating of about 0.0002 to 0.0003 inch thickness. This nickel flash coating is applied in order to aid in wetting and flowing of the silver brazing alloy during the subsequent brazing operation.

The Fansteel "63" Metal tantalum sheet material is chemically cleaned by pickling in an acid solution comprised of:

Nitric Acid (70%)—3 parts by volume (60%) by volume)

Sulphuric Acid (95%)—1 part by volume (20%) by volume)

Hydrofluoric Acid (48%)—Up to 1 part by volume (Up to 20% by volume)

After the acid immersion, the tantalum alloy sheet is removed from the acid solution and immediately immersed in clean water. This is followed with a water rinse with the water temperature above 50° C. (125° F.). Following the water rinsing, the material is rinsed in alcohol, followed by drip drying and wiping of the excess alcohol from the surface using lint-free, clean white cloth. Then, the tantalum material is electroplated with nickel to provide a flash coating of about 0.0002 to 0.0003 inch thickness only on the surface of the tantalum alloy material that will face the steel flange during the brazing operation. The opposite surface of the tantalum alloy material that will subsequently face the process side in the chemical application is masked so that it will not become plated. Also, areas at least 1 inch back from positions on the tantalum alloy material to be subsequently welded, such as lip weld 13 and silver braze 16, are also masked so that no nickel plating occurs in the areas to be subsequently welded.

Then, the steel flange is inverted from the position shown in FIG. 1. Next, pieces of 0.015 inch thickness strip of a silver-copper eutectic alloy, containing 72% silver and 28% copper and corresponding to the AWS-ASTM classification BAg-8, are placed with a relatively uniform distribution on the flat steel flange surface. No brazing flux is used. The total amount of the silver brazing alloy 18 in the braze bond will be about 0.002 to 0.003 inch thickness after the brazing operation, with the silver brazing alloy coating essentially the entire flat face of the steel flange up to radius 12. Then, the tantalum alloy layer 11 is placed over the silver brazing alloy strips.

The silver brazing alloy can be in the form of strip, such as 0.015 inch thickness material used, or foil, such as about 0.003 inch thickness, wire, or powder. Suitable brazing alloys, in addition to the eutectic silver-copper alloy used, can be those recommended in the cited article by Torti and Douglass, or silver alloy filler materials according to AWS classifications BAg-1 through 19 as covered in Metals Handbook, Volume Six, Eighth Edition, "Welding and Brazing," since essentially all of these alloys have melting or flow temperatures at or below the silver-copper eutectic alloy, and they also generally have at least as good flow and wetting properties. In the specific embodiment described, it is desirable to avoid the use of silver brazing alloys that contain elements such as zinc, cadmium, nickel, tin and lithium. It is also desirable to avoid the use of a brazing flux, since it would be necessary to completely remove any residues to insure against corrosion from the flux during subsequent service. Even with the use of the silver-copper alloy eutectic, the brazed final parts should have no silver brazing alloy in the immediate vicinity of locations where fusion welds will be made in the tantalum alloy material.

The nickel electroplate flash coating is considered state-of-the-art, but it does provide improvement in the flow and wetting characteristics of the brazing alloy. It is possible to successfully make brazed assemblies as described without using the nickel plating, but the brazing temperature must be increased, and complete wetting and bonding on all portions of the interface may not be achieved. It is desirable to subject the nickel plated tantalum material to a diffusion treatment at about 1205° C. (2200° F.) at $10^{-3}$ Torr to bond the nickel to the tantalum.

Brazing can be conducted with the assembly placed in a heat-resistant muffle. The muffle containing assembly to be brazed is placed in a cold furnace, and the muffle is evacuated to an absolute pressure of about $10^{-4}$ Torr. Then, the furnace is heated to a temperature somewhat above 780° C. (1435° F.), which is the melting point of the silver-copper eutectic alloy. The furnace is then allowed to cool, the muffle removed from the furnace, and the brazed assembly removed from the muffle.

In brazing a flat tantalum alloy layer directly to a steel flange, the tantalum alloy layer will be severely buckled, wrinkled and distorted, and pulled away from the steel substrate in areas of severe puckering and buckling.

The present invention involves preparing a tantalum alloy layer with convolutions 19 and 20 formed in the tantalum alloy liner 11. These convolutions have the cross-sectional contour shown in FIG. 2, and are produced by roll forming convolution 19 as a 34" diameter circular ring and convolutions 20 as a 44" diameter ring. Thus, these circular convolution rings are generally concentric and spaced approximately symmetrically over the liner layer on the steel flange 10. A flange with these convolutions showed essentially complete bonding of the tantalum alloy liner 11 to steel flange 10 following the vacuum furnace brazing operation using the same process as employed with a flat sheet. As shown in FIG. 1, a portion of the tantalum liner 11 extends between the hole and the end of the flange 10 and is brazed to the flange essentially throughout an area extending at least 10 inches outwardly beyond the entire periphery of the hole through the liner. In addition, the brazed tantalum alloy liner 11 was perfectly flat and smooth, and in continuous contact with steel flange 10 over the entire silver brazed area.

Thus, these convolutions, which are approximately symmetrically positioned in the tantalum alloy material, solved the distortion problem during the furnace brazing operation.

In order for such convolutions to be effective in overcoming the problem of distortion of the tantalum alloy facing during the brazing operation, the convolutions must not only act as a bellows to compensate for the differences of thermal expansion between the tantalum material and the steel; they also must be relatively symmetrically spaced in the tantalum material facing, and have their long axis oriented in a direction normal to the direction of the maximum expansion and contraction of the assembly during heating and cooling. The convolution design shown in FIG. 2, which illustrates the convolution used for a tantalum alloy liner thickness of about 0.030 inch, has been found to be effective for this purpose. Although at least one convolution is relatively effective, two or more symmetrically spaced convolutions appear to be preferred.

These convolutions not only solve the problem of distortion of the tantalum alloy liner during the brazing operation, but they also subsequently act as a bellows during subsequent service to compensate for differences in thermal expansion of the tantalum material and the steel when the chemical process equipment is heated to and cooled from process temperature in the specific service conditions.

Following the brazing operation, the brazed flange is inverted to the original position shown in FIG. 1, and placed in a welding chamber.

In welding tantalum materials, adequate cleaning of the materials and shielding of the weld area with inert gas are mandatory. Such refractory metal materials can be successfully fusion welded using techniques such as inert gas shielded tungsten arc welding and electron beam welding. The inert gas shielded tungsten arc welding (often called TIG welding) is the most commonly used procedure, and was used in making the fusion welds in the clad flange described. The welding chamber is evacuated and purged with argon gas. Other inert gases can be used, such as any one or a mixture of inert monatomic gases, such as argon, helium, neon, krypton and xenon; but argon is most frequently used.

The inert gas must be high purity, and in the case of argon it must have an oxygen content not exceeding 5 ppm and preferably 1.5 ppm or less.

A cleaned, formed Fansteel "63" Metal section 14 with a formed radius 15 is placed in position against tantalum alloy layer 11 in preparation for making lip weld 13. Before making the weld, the chamber is evacuated and back filled with high purity argon. Welding is done by the TIG method. To further provide an essentially contamination-free welding environment, TIG welds are first made on tabs of titanium until bright welds are obtained before any welding is done on the tantalum alloy material.

The lips of the tantalum alloy layers 11 and 14 are clamped with clips until the bond is tack welded; then the circumferential lip weld 13 is made.

Next, a pure silver fillet braze weld 16 is made with a TIG welding torch, in the same inert gas chamber, to secure tantalum alloy facing 14 against the top surface of steel flange 10.

An additional feature of the flange construction is a weep hole 17 machined in the steel flange as shown in FIG. 1. This weep hole is not needed in making the welds on the tantalum alloy material when the welding is done in a chamber as described. But the weep hole can be used to purge the root side of the tantalum alloy welds when it is necessary to do the welding outside of a chamber. In such cases, such as with very large parts, a plastic bag or sheet is taped onto the lining or facing, or the entire member may be placed in a plastic bag in which the TIG welding is performed. In either case, it is customary to leave the weep hole 17 in the steel flange 10 open even after the entire welded assembly is completed since the weep hole now serves a second purpose of being used for the purpose of leak detection during subsequent service.

Bonding of a tantalum alloy cladding containing symmetrical circular convolutions by furnace brazing under vacuum with a silver brazing alloy to bond the tantalum alloy to a steel flange has been illustrated as an example of the assembly and method of fabricating it. However, the improvements incorporated in the assembly and method of the assembly are not limiting, since the assembly and the method of construction described can be applied to a broad range of braze bonded equipment and to a large number of dissimilar material combinations as covered by the claims.

I claim:

1. A wall assembly having a first structural layer of metal selected from the group consisting of iron, nickel, and cobalt base metals and alloys thereof, a comparatively thin second layer of a corrosion resistant metal selected from the group consisting of titanium, zirconium, hafnium, tantalum, columbium, vanadium, and fabricatable and weldable alloys thereof, and said second layer at least in part overlying said first layer, the improvement comprising said second layer having a hole therethrough, said second layer extending in the range between said hole and the end of said flange at least ten inches outwardly beyond the entire periphery of said hole, at least a portion of one face of said second layer being united by a brazing alloy to a face of an adjacent portion of said first layer essentially throughout an area within said range and extending at least ten inches outwardly beyond the entire periphery of said hole, said second layer having at least one convolution encircling said hole and in said portion of said second layer having said one face brazed to said face of said adjacent portion of said first layer, said second layer being brazed to said first layer immediately adjacent both sides of said convolution, and said hole and said convolution being present in said second layer prior to the brazing of said one face of said second layer to said face of said adjacent portion of said first layer such that said second layer, when brazed to said first layer, remains united to said first layer without wrinkling, buckling, puckering, or separating of said second layer, both when said wall assembly is initially cooled after brazing from its brazing temperature to an ambient temperature and if subsequently raised to an elevated temperature of about 200° C.

2. The improvement in the wall assembly of claim 1 wherein said second layer brazed to said first layer has a thickness not greater than about 0.03 of an inch.

3. The improvement in the wall assembly of claim 1 wherein said second layer also has a circumferentially continuous and generally axially extending portion adjacent one edge of said first layer, said axially extending portion also being brazed to said first layer and being present in said second layer prior to the brazing of said second layer to said face of said first layer.

4. The improvement in the wall assembly of claim 3 wherein said second layer brazed to said first layer has a thickness not greater than about 0.03 of an inch.

5. The improvement in the wall assembly of claim 1 wherein each of said convolutions in said second layer is generally circular and substantially concentric with said hole through said second layer.

6. The improvement in the wall assembly of claim 1 wherein said first structural layer also has a hole therethrough and a generally flat face to which said one face of said second layer is brazed, and each of said convolutions in said second layer is generally circular and substantially concentric with said hole through said first structural layer.

7. The improvement in the wall assembly of claim 1 which further comprises a plurality of convolutions, each encircling said hole and in said portion of said second layer brazed to said face of said adjacent portion of said first layer with said convolutions extending generally transversely of the direction of maximum thermal expansion and contraction of said brazed together portions of the wall assembly, and said convolutions being generally symmetrically spaced apart in such direction of greatest thermal expansion and contraction throughout said second layer brazed to said face of said adjacent portion of said first layer.

8. The improvement in the wall assembly of claim 7 which further comprises said second layer brazed to said first layer having a thickness not greater than about 0.03 of an inch.

9. The improvement in the wall assembly of claim 7 wherein the brazing alloy consists essentially of a silver-copper alloy.

* * * * *